April 8, 1930.  H. B. DICKENS  1,753,367
LEG REST FOR THE DRIVERS OF MOTOR CARS
Filed July 30, 1928
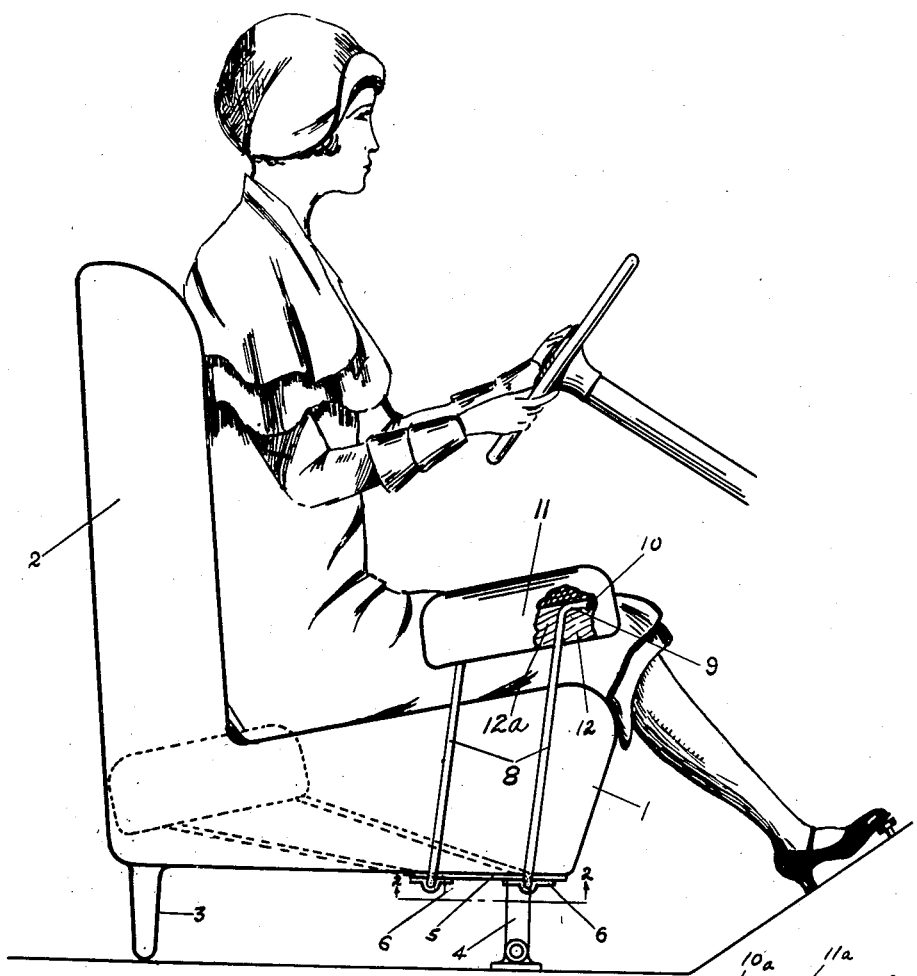
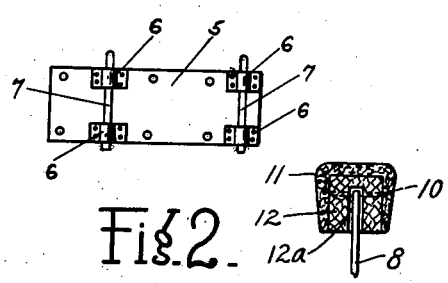
INVENTOR.
HOWARD B. DICKENS.
BY Philip S. Hopkins
ATTORNEY Patented Apr. 8, 1930

1,753,367

UNITED STATES PATENT OFFICE

HOWARD B. DICKENS, OF ENDICOTT, NEW YORK

LEG REST FOR THE DRIVERS OF MOTOR CARS

Application filed July 30, 1928. Serial No. 296,193.

This invention pertains to a leg rest for the driver of a motor car, and has for its primary object the provision of a foldable pad or supporting device which may be positioned adjacent the driver's leg for support, or which may be folded back entirely out of the way when not in use.

Another object of my invention is to provide such a rest member with means for swingably supporting the same either in position of use or out of supporting position, and in such manner as not to interfere with the entry into the seat of the car from either side, and in addition so as not to project into or occupy any of the space between the back of the front seats of the car and the rear seats thereof.

Still another object lies in the provision of means whereby the supports for the rest member can be adjusted whereby if desired, the leg rest can be made use of as an arm rest.

A still further object lies in the simplicity of construction, the ease of operation and the relatively few parts required.

Other objects and advantages in details of construction and operation will be apparent as the description now proceeds, reference being had to the figures of the accompanying drawing wherein like reference numerals indicate like parts.

In the drawing:—

Figure 1 is a side view of the driver's seat of an automobile illustrating my invention in cooperation therewith.

Figure 2 is a detail view of the pivot bracket for swingably supporting the leg rest.

Figure 3 is a detail side view partly in section for clearness, illustrating a modification of my invention wherein the leg rest is adjustable for use as an arm rest.

Figure 4 is a detail cross sectional view of the pad 11.

As is well known to drivers of automobiles, particularly those who drive for long distances at a time, it is very tiring on the right leg to hold it in position for properly operating the foot throttle of the car without any means of support or rest device. I have provided a novel and efficient leg rest for this purpose which may be quickly and readily moved to supporting position and which can also be easily moved out of supporting position, and when so moved does not interfere in any way either with the free movement of the driver or passengers from one front seat to another, or with the free use of the space between the front and back seats. It will be understood that this leg rest is particularly adaptable to the type of automobiles having a divided front seat.

I have indicated by the reference character 1 the driver's seat having the back 2 and the supporting legs 3 and 4. On the underside of this seat 1 and on the right hand side thereof at a point adjacent the forward edge, I suitably secure a plate 5 provided with bearing straps 6 suitably mounted upon the plate 5 and adapted to rotatably receive the angularly bent ends 7 of vertically extending rods 8 adapted to extend upwardly alongside the seat 1 as shown clearly in Figure 1. The upper ends of these rods 8 are provided with angular bends extending forwardly of the seat as at 9 and the free ends of which are pivoted as at 10 to a pad member 11 consisting of a block 12 suitably padded and covered with preferably upholstering material to match the upholstery of the car. The block 12 is slotted as at 12$^a$ to receive the upper ends of the rods 8 and permit pivotal movement thereof. The length of the supporting rods 8 is preferably such as to position the pad 11 when in the position shown in Figure 1 properly along side and directly above the seat 1 and against which the right leg of the driver may be rested while driving the car.

Obviously by virtue of the pivots 10 at the upper end of the rods and the pivotal connection with the plate 5 underneath the seat, the rods 8 and pad 10 may be swung rearwardly to the position shown in dotted lines in Figure 1 where the same are out of the way and do not interfere with free movement of the driver or passengers between the two front seats.

It will be noted also with reference to Figure 1 that the rods 8 when swung to leg rest position are on a slight forward angle, whereby the same will be prevented from accidentally jarring back to the position shown in dotted lines while the car is in motion. Of course if desired, any suitable stop means may be provided to prevent the rods 8 and pad 11 from moving beyond predetermined points in operative or inoperative positions. Ordinarily, there will be a sufficient friction between the angular ends 7 of the rods and the straps 6 forming bearings therefor, to prevent accidental displacement.

In order that the device might also be used as an arm rest if desired, I have shown in Figure 3 a modification wherein the rods 8ᵃ are slidably mounted with the tubes 8ᵇ, the latter being provided with the same swingable mounting with respect to the bracket plate 5 as shown in Figure 1. The rods 8ᵃ and tubes 8ᵇ are preferably so sized that there will be a tight frictional engagement between the two whereby the pad 11ᵃ will be maintained in proper adjusted position. Naturally, if desired, some suitable catch means for locking the parts in adjusted position may be provided.

The upper ends of the rods 8ᵃ are provided with angular bends 9ᵃ and pivoted to the pad 11ᵃ as at 10ᵃ in the same manner as shown in Figure 1.

In the use of my invention, the leg rest or pad will normally be swung rearwardly to the position in dotted lines in Figure 1, where it is out of the way and takes up no normally usable space. When the driver desires however, to position the rest for supporting the right leg while driving, it is merely necessary to swing the pad forwardly to the position shown in Figure 1 where it provides an efficient and comfortable rest against which the leg may be supported. With the construction shown in Figure 3, if it is desired to use the pad as an arm rest, it may be pulled upwardly vertically into position for supporting the driver's right arm. In such event, however, the rod 8ᵃ should be positioned downwardly in the tubes 8ᵇ when the driver is through using it as an arm rest, whereby when the same is swung to the rear out of supporting position, it will not project beyond the back 2 of the front seat and into the leg space between the front and rear seats.

It will be understood that changes may be made in details of construction and arrangement of parts without departing from the spirit and scope of my invention. I do not limit myself, therefore, to the exact structure herein shown and described, other than by the appended claims.

I claim:—

1. In combination with a vehicle seat, a pair of supporting members pivoted to the underside of said seat and extending upwardly adjacent thereto, a rest member pivotally supported at the upper ends of said support members and swingable therewith into and out of rest position along side of said seat and substantially below the level of said seat in one position.

2. In combination with a vehicle seat, a pair of vertically adjustable supporting members pivoted to the underside of said seat and extending upwardly adjacent thereto, a rest member pivotally supported at the upper ends of said support members and swingable therewith into and out of rest position along side of said seat and substantially below the level of said seat in one position.

In testimony whereof, I affix my signature.

HOWARD B. DICKENS.